Feb. 28, 1956 R. S. TICE 2,736,174
COOLER FOR PACKAGED BEVERAGES AND METHOD
Filed Jan. 11, 1954

INVENTOR.
REUBEN S. TICE
BY
Boyken, Mohler & Beckley
ATTORNEYS

United States Patent Office 2,736,174
Patented Feb. 28, 1956

2,736,174

COOLER FOR PACKAGED BEVERAGES AND METHOD

Reuben S. Tice, Monterey, Calif.

Application January 11, 1954, Serial No. 403,336

10 Claims. (Cl. 62—92)

This invention relates to a cooler for packaged beverages and the like, such as bottled wine and to a method of cooling products that are bottled, canned or that are in a condition suitable for being cooled by the present method. Neither the title nor the description are restrictive of the cooler or method to any particular product or products or to their condition so long as the device or the steps of the method would be suitable for cooling the product to be cooled.

One of the objects of the invention is the provision of a device for use in rapidly and uniformly reducing the temperature of packaged beverages, such as are in bottles or cans and which device is easy to use, simple in construction, economical to make, compact, economical to operate and rugged, and that is adapted to utilize the evaporation of $CO_2$ and sublimation of solid $CO_2$ resulting from vaporization to effect the cooling of the articles to be cooled.

Another object of the invention is the provision of a cooler for bottled wine and the like that is capable of reducing the temperature of the contents of a sealed bottle of wine from say room temperature of about 60 to 70° F. to about 35° F. in about 4 to about 10 minutes according to the size and thickness of the bottle and the contents.

Still and sparkling wines should not be stored or held for any great length of time under refrigeration, but should be cooled to the desired degree at the time they are used. This is difficult to control inasmuch as the occasion for using the wine may arise rather suddenly, or in the case of restaurants and hotels, the demand many times exceeds the supply and only partially cooled wine can be served, which is very unsatisfactory to persons having a discriminating taste.

With the present invention, a bottled beverage can be safely cooled to the desired temperature without altering flavor or any of its other characteristics, except temperature, within a period of less than ten minutes' time. For example, a fifth of champagne may be cooled from 60° to 70° F. to about 35° F. within about seven minutes' time, and a similar sized bottle of still wine can be cooled to the same degree in about four minutes' time. Obviously smaller bottles would require less time and larger bottles would require a longer time, but to reduce the temperature by refrigeration or by icing in the conventional manner would be too long to be practical hence would not even be attempted. With this invention, wine at room temperature when persons are first seated at a dinner table can be reduced to about 35° F. by the time it is required for use.

Other objects and advantages will appear in the description and drawings.

Figure 1:
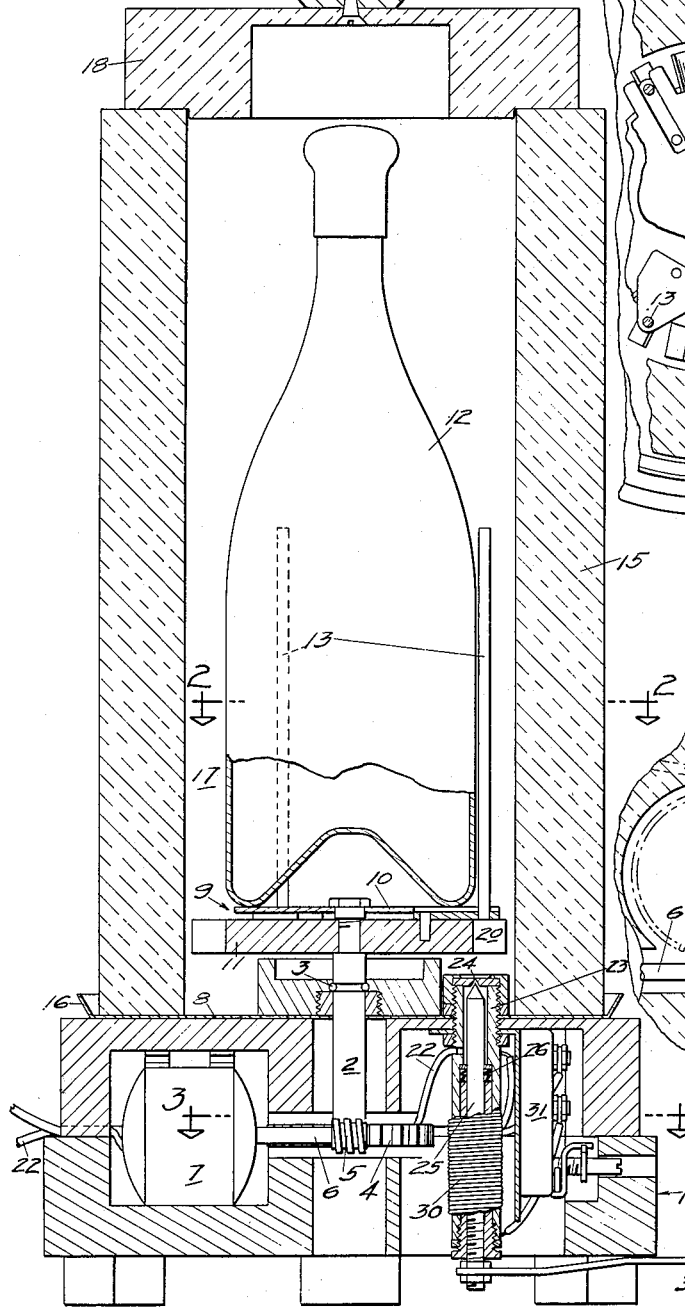
Fig. 1 is a vertical sectional view through a cooler showing a bottle in the cooler, partly in section and partly in elevation.
Figure 2:
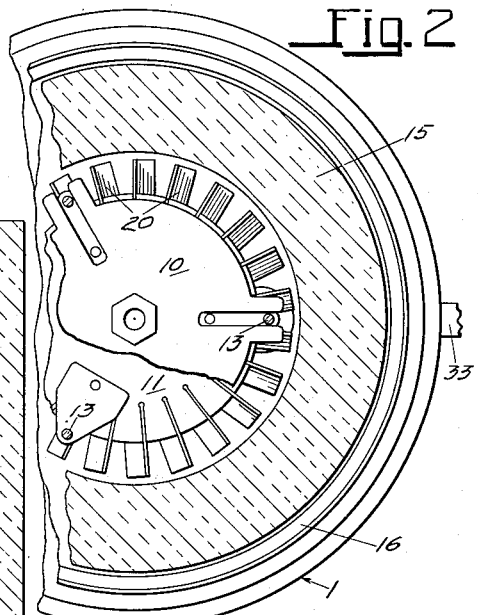
Fig. 2 is a fragmentary sectional view taken along the line 2—2 of Fig. 1, but omitting the bottle shown in Fig. 1.
Figure 3:
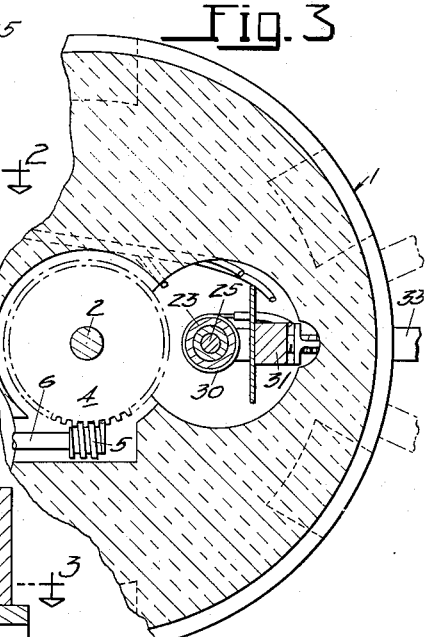
Fig. 3 is a fragmentary sectional view taken along line 3—3 of Fig. 1.

In detail, the device herein illustrated comprises a base, generally designated 1, in which is positioned a central, vertical shaft 2 supported for rotation by a bearing 3. The lower end of said shaft has a worm wheel 4 secured thereto, the teeth of which are in mesh with a considerably smaller worm gear 5, the latter being secured on drive shaft 6 of a motor 7, all of which may be enclosed in base 1. The worm gears 4, 5 effect a substantial reduction in the speed of rotation of shaft 2 as compared with that of shaft 6, the former being preferably from about 150 R. P. M. to say 250 R. P. M. where still wine is being cooled, and where sparkling wine or champagne is being cooled the speed at which shaft 2 is driven is preferably much slower, say about 60 to 70 R. P. M. Obviously, the motor 7 may be a variable speed motor or shaft 2 could be driven directly by a phonograph motor where the cooler is for champagne and the like.

The upper end of shaft 2 extends through and above the upper side 8 of base 1, and the elements in said base are preferably all below and concealed by top 8.

Secured to the upper end of shaft 2 is a support generally designated 9. This support may include a platform 10 of metal spaced above a table 11, the latter being connected therewith, although the table and support 9 could be integrally formed.

A bottle 12 of wine is adapted to be supported on said support (platform 10) and said support has several equally spaced upstanding arms 13 secured thereto for holding said bottle on the support coaxial with shaft 2.

Supported on the upper side 8 of base 1 is a vertically extending tubular housing 15 of heat insulation material. This housing is removable from the base but is held concentric with the axis of rotation of support 9 by an annular upwardly and outwardly inclined flange 16 on said side 8.

The cylindrical side walls of the housing enclose the support 9, being equally spaced around the latter, and they extend upwardly a sufficient distance to enclose bottle 12, leaving an annular space 17 between the said sides and the outer sides of the bottle.

A cap or closure 18 also of heat insulation material is removably supported on the upper end of the housing to close the open upper end of the latter.

The platform 10 and table 11 will be referred to as the "support" for the article to be cooled, and said support is provided with an annular row of vanes 20 projecting radially outwardly of the circular periphery of said support. These vanes are inclined at similar angles to horizontal so that a jet of $CO_2$ directed generally upwardly at one side of the support so as to strike the vanes will not only cause the support to rotate in one direction but will cause said $CO_2$ to be diffused in space 17. For still wines and in the absence of a brake or governor, rotation of the support 9 by means of $CO_2$ striking said vanes could constitute the means for rotating the said support. However, the use of the motor is preferable. With a brake or governor the use of the $CO_2$ for rotating the support could be used for champagne and the like. In any event, the vanes will function to assist in the rotation of the support, and the motor will control the speed and prevent any possibility of the support stopping due to sticking or temperature variations in working parts.

The $CO_2$ is supplied in liquid form from a tank of liquid $CO_2$ (not shown) under pressure, and it is conducted to the interior of the cooling chamber by a conduit 22. One end of which constitutes a valve body 23 having a discharge opening 24 that is in the lower end of the cooling chamber enclosed by housing 15. This discharge opening is directed upwardly toward the vanes 20 at one side of the annular row of the latter, and as said vanes are just outside the periphery of bottle 12 and support 9, the $CO_2$ from said discharge opening will strike said vanes and will be diffused into space 17 while the bottle and said support rotate about their common axis. The extremely low temperature created in space 17 and on the bottle by the expansion of the liquid $CO_2$ and sublimation of the Dry Ice that is formed, will effect a very rapid cooling of the contents of the bottle 12, and rotation of the bottle during the cooling will result in a uniform and accelerated cooling such as would not be possible were the bottle stationary during cooling, or were no diffusion of the $CO_2$ to occur.

The elevation of the platform 10 above the table 11 will effect a faster transfer of heat between said platform than otherwise would occur, although satisfactory results are obtainable where the platform and table are integral.

Within valve body 23 is a valve member 25 that is of the needle valve type, in which the tapered end surface seats against complementarily formed surfaces in opening 24. Sealing rings 26 of any suitable material, but preferably of plastic, rubber-like material such as neoprene form a seal between body 23 and member 25 below the inlet for $CO_2$ into said member and thus any gas or $CO_2$ in the body 23 will not escape when the valve is closed.

The lower end of body 23 may be threaded for a packing nut through which the lower end of member 25 is threaded so that rotation of said member 25 in one direction or the other will open or close the discharge opening 24. It is pertinent to note that any $CO_2$ passing through said opening will enter the cooling chamber directly, so that no expansion will take place in the valve body.

In order to positively maintain the valve in working order, an electrical heating coil 30 is around the section of conduit 22 that forms the valve body 23. There is an adjustable thermostat 31 in the electrical circuit in which coil 30 is disposed.

A valve handle 33 connected with the lower exposed end of valve member 25 projects laterally of base 1 for actuation by an operator for opening or closing the valve, and preferably this coil 22 may be in the motor circuit, so that upon starting the motor the coil will be energized.

In operation, the cover 18 may be removed and bottle 12 placed on support 9 with the arms 13 supporting the bottle coaxial with the axis of rotation of support 9.

The cover is then replaced and a switch in the electrical circuit is actuated to start the motor and the heater, after which the valve for $CO_2$ is opened and from there $CO_2$ is injected into the cooling chamber and against the outer sides of the bottle.

I claim:

1. A cooler comprising: a rotary, horizontal support for supporting an article to be cooled, means for causing rotation of said support, a closed heat insulated housing including a bottom wall, side walls, and a top wall, enclosing said support and the article to be cooled when the latter is supported on said support, means carried by said support for releasably holding said article on the latter spaced from said side walls, a conduit for $CO_2$ having a discharge opening directed into the space around such article when the latter is held on said support and within said housing, a valve movable to and from a position closing said discharge opening and means connected with said valve and accessible to an operator outside said housing for moving said valve.

2. A cooler comprising: a rotary, horizontal support for supporting an article to be cooled, means for causing rotation of said support, a heat insulated housing enclosing said support and the article to be cooled when the latter is supported on said support, a conduit for $CO_2$ having a discharge opening directed into the space enclosed by said housing, a valve movable to and from a position closing said discharge opening and means connected with said valve and accessible to an operator outside said housing for moving said valve, a stationary base on which said support is rotatably mounted and on which said housing is stationarily supported, a heater carried by said base and said valve being adjacent to said heater for receiving heat therefrom.

3. A cooler comprising: a rotary, horizontal support for supporting an article to be cooled, means for causing rotation of said support, a heat insulated housing enclosing said support and the article to be cooled when the latter is supported on said support, a conduit for $CO_2$ having a discharge opening directed into the space enclosed by said housing, a valve movable to and from a position closing said discharge opening and means connected with said valve and accessible to an operator outside said housing for moving said valve, a stationary base on which said support is rotatably mounted and on which said housing is stationarily supported, a heater carried by said base and said valve being adjacent to said heater for receiving heat therefrom, said means for causing rotation of said support including a motor carried by said base below said housing and connected with said support, elements on said support positioned for intercepting $CO_2$ from said discharge opening for diffusing said $CO_2$ within the space enclosed by said housing.

4. A cooler comprising: a rotary support for supporting an article to be cooled, means for causing rotation of said support, a conduit for $CO_2$ having a discharge opening adjacent to said support positioned eccentric to its axis of rotation and directed generally toward the outer sides of such article when the latter is on said support, a heat insulated housing enclosing said support in spaced relation thereto, a valve member in a section of said conduit movable to and from a position closing said opening, means accessible to an operator outside said housing connected with said member for moving the latter and means for heating said section of said conduit.

5. A cooler comprising: a rotary support for supporting an article to be cooled, means for causing rotation of said support, a conduit for $CO_2$ having a discharge opening adjacent to said support positioned eccentric to its axis of rotation and directed generally toward the outer sides of such article when the latter is on said support, a heat insulated housing enclosing said support in spaced relation thereto, a valve member in a section of said conduit movable to and from a position closing said opening, means accessible to an operator outside said housing connected with said member for moving the latter and means for heating said section of said conduit, a plurality of vanes secured to said support and movable across said opening upon rotation of said support for engagement by $CO_2$ discharged from said opening to effect diffusion of said $CO_2$.

6. A cooler comprising: a rotary support for supporting an article to be cooled, means for causing rotation of said support, a conduit for $CO_2$ having a discharge opening adjacent to said support positioned eccentric to its axis of rotation and directed generally toward the outer sides of such article when the latter is on said support, a heat insulated housing enclosing said support in spaced relation thereto, a valve member in a section of said conduit movable to and from a position closing said opening, means accessible to an operator outside said housing connected with said member for moving the latter and means for heating said section of said conduit, a plurality of vanes secured to said support and movable across said opening upon rotation of said support for engagement by $CO_2$ discharged from said opening to effect diffusion of said $CO_2$, said means for causing rotation of said support including a plurality of similarly inclined vanes projecting laterally from said support around its periphery, and across said opening spaced from the latter whereby $CO_2$ striking said vanes will also be diffused.

7. A cooler comprising: a rotary support for supporting an article to be cooled, means for causing rotation of said support, a conduit for $CO_2$ having a discharge opening adjacent to said support positioned eccentric to its axis of rotation and directed generally toward the outer sides of such article when the latter is on said support, a heat insulated housing enclosing said support in spaced relation thereto, a valve member in a section of said conduit movable to and from a position closing said opening, means accessible to an operator outside said housing connected with said member for moving the latter and means for heating said section of said conduit, said support being horizontal and rotatable about a vertical axis, means on said support for engaging and for releasably holding such bottle coaxial with the axis of rotation of said support, said support being circular and concentric with said axis.

8. A cooler comprising: a rotary support for supporting an article to be cooled, means for causing rotation of said support, a conduit for $CO_2$ having a discharge opening adjacent to said support positioned eccentric to its axis of rotation and directed generally toward the outer sides of such article when the latter is on said support, a heat insulated housing enclosing said support in spaced relation thereto, a valve member in a section of said conduit movable to and from a position closing said opening, means accessible to an operator outside said housing connected with said member for moving the latter and means for heating said section of said conduit, said means for causing rotation of said support including a motor connected therewith, and outside the space enclosed by said housing, and means extending across said opening within said space and spaced from said opening for engagement by $CO_2$ discharged from said opening to cause diffusion of said $CO_2$.

9. A wine cooler for wine in bottles comprising: a horizontal support, means mounting said support for rotation about a vertical axis, means on said support for releasably holding a filled wine bottle thereon concentric with said axis, a vertically elongated heat insulated housing enclosing said support and projecting above the latter a sufficient distance to enclose such bottle in spaced relation thereto when the latter is on said support, the side walls of said housing being cylindrical and coaxial with said support whereby an annular space will be between said walls and such bottle, a conduit for $CO_2$ having a discharge opening directed upwardly from a point adjacent to said support and into said annular space, vanes on said support projecting across said opening and between it and said annular space for diffusing $CO_2$ into said space upon discharge of said $CO_2$ from said opening and upon rotation of said support.

10. The method of cooling a cylindrically sided container and the contents thereof that comprises the steps of: rotating said container and contents about the axis of the container and within an enclosed space, discharging liquid $CO_2$ into said space and along the outer lateral sides of said container and diffusing the said $CO_2$ by impact with a hard surface before said $CO_2$ reaches said outer lateral sides.

References Cited in the file of this patent

UNITED STATES PATENTS

| | | |
|---|---|---|
| 779,962 | Nobis | Jan. 10, 1905 |
| 1,515,119 | Josephson | Nov. 11, 1924 |
| 2,587,075 | Tice | Feb. 26, 1952 |